United States Patent
Kitazawa et al.

(10) Patent No.: US 11,912,869 B2
(45) Date of Patent: Feb. 27, 2024

(54) NON-CURABLE THERMAL-CONDUCTIVE SILICONE COMPOSITION

(71) Applicant: SHIN-ETSU CHEMICAL CO., LTD., Tokyo (JP)

(72) Inventors: Keita Kitazawa, Annaka (JP); Wataru Toya, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 386 days.

(21) Appl. No.: 17/431,363

(22) PCT Filed: Feb. 4, 2020

(86) PCT No.: PCT/JP2020/004191
§ 371 (c)(1),
(2) Date: Aug. 16, 2021

(87) PCT Pub. No.: WO2020/179325
PCT Pub. Date: Sep. 10, 2020

(65) Prior Publication Data
US 2022/0135799 A1 May 5, 2022

(30) Foreign Application Priority Data
Mar. 4, 2019 (JP) .................. 2019-038421

(51) Int. Cl.
*C08L 83/04* (2006.01)
*C08K 3/28* (2006.01)

(52) U.S. Cl.
CPC ............. *C08L 83/04* (2013.01); *C08K 3/28* (2013.01); *C08K 2003/282* (2013.01); *C08K 2201/001* (2013.01); *C08K 2201/005* (2013.01); *C08L 2205/025* (2013.01)

(58) Field of Classification Search
CPC .................. C08L 83/00; C08L 83/04
See application file for complete search history.

(56) References Cited

U.S. PATENT DOCUMENTS

| | | | |
|---|---|---|---|
| 4,117,028 A | 9/1978 | Hahn | |
| 4,268,452 A * | 5/1981 | Mine | C08K 3/013 524/860 |
| 6,136,758 A * | 10/2000 | Yamada | C10M 113/16 508/172 |
| 6,433,055 B1 * | 8/2002 | Kleyer | C08K 3/08 524/588 |
| 8,754,165 B2 * | 6/2014 | Matsumoto | C08L 83/04 524/588 |
| 2002/0193461 A1 * | 12/2002 | Zoellner | C09D 183/04 528/33 |
| 2003/0049466 A1 | 3/2003 | Yamada et al. | |
| 2007/0149834 A1 | 6/2007 | Endo et al. | |
| 2008/0254247 A1 | 10/2008 | Asaine | |
| 2010/0006798 A1 | 1/2010 | Endo | |
| 2010/0225995 A1 | 9/2010 | Paolini, Jr. et al. | |
| 2011/0024675 A1 | 2/2011 | Endo et al. | |
| 2011/0248211 A1 | 10/2011 | Matsumoto et al. | |
| 2014/0309447 A1 | 10/2014 | Standke et al. | |
| 2017/0081578 A1 | 3/2017 | Kato et al. | |
| 2017/0260392 A1 | 9/2017 | Kitazawa et al. | |
| 2020/0071526 A1 | 3/2020 | Kitazawa et al. | |
| 2021/0087394 A1 * | 3/2021 | Shimano | C09D 7/20 |

FOREIGN PATENT DOCUMENTS

| | | | | |
|---|---|---|---|---|
| CN | 101624514 A | 1/2010 | | |
| CN | 104053701 A | 9/2014 | | |
| CN | 106414613 A | 2/2017 | | |
| CN | 107001802 A | 8/2017 | | |
| CN | 110551394 A | * 12/2019 | ............... | C08K 3/22 |
| JP | H08-208993 A | 8/1996 | | |
| JP | 2623385 B2 | * 6/1997 | | |
| JP | 2938428 B1 | 8/1999 | | |
| JP | 2938429 B1 | 8/1999 | | |
| JP | 3580366 B2 | 10/2004 | | |
| JP | 2005-015462 A | 1/2005 | | |
| JP | 3952184 B2 | 8/2007 | | |
| JP | 2008-260798 A | 10/2008 | | |
| JP | 2009-209165 A | 9/2009 | | |
| JP | 2009-209230 A | 9/2009 | | |
| JP | 2010-150399 A | 7/2010 | | |
| JP | 4572243 B2 | 11/2010 | | |
| JP | 2010-280806 A | 12/2010 | | |
| JP | 4656340 B2 | 3/2011 | | |
| JP | 4913874 B2 | 4/2012 | | |
| JP | 4917380 B2 | 4/2012 | | |
| JP | 4933094 B2 | 5/2012 | | |
| JP | 5365572 B2 | 12/2013 | | |

(Continued)

OTHER PUBLICATIONS

Machine translation of CN-110551394-A (2019, 15 pages).*

(Continued)

*Primary Examiner* — Brieann R Johnston
(74) *Attorney, Agent, or Firm* — Oliff PLC

(57) ABSTRACT

A non-curable thermal-conductive silicone composition contains essential components of: (A) an organopolysiloxane having a kinematic viscosity at 25° C. of 1,000,000 mm$^2$/s or more in an amount of 5 to 20 mass % relative to a sum of the component (A) and a component (B); (B) a hydrolysable organopolysiloxane compound shown by the following general formula (1) in an amount of 80 to 95 mass % relative to the sum of the components (A) and (B); and (C) a heat conductive filler in an amount of 10 to 95 mass % relative to a total amount of the composition. A mixture of the components (A) and (B) has a molecular weight distribution Mw/Mn of 10 or more. R$^1$ represents a monovalent hydrocarbon group having 1 to 10 carbon atoms optionally having a substituent. "m" represents an integer of 5 to 100.

(1)

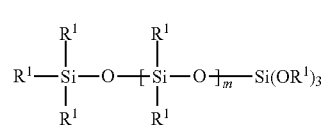

8 Claims, No Drawings

(56) References Cited

FOREIGN PATENT DOCUMENTS

| | | | | |
|---|---|---|---|---|
| JP | 2014-080546 A | | 5/2014 | |
| JP | 2014077278 A | * | 5/2014 | |
| JP | 2015-140395 A | | 8/2015 | |
| JP | 2016-079204 A | | 5/2016 | |
| JP | 2018-076423 A | | 5/2018 | |
| KR | 2000048594 A | * | 7/2000 | .............. C08L 23/04 |
| KR | 10-2009-0094761 A | | 9/2009 | |
| WO | 2019/039468 A1 | | 2/2019 | |

OTHER PUBLICATIONS

Machine translation of JP-2014077278-A(2014, 9 pages).*
Machine translation of KR-2000048594-A (2000, 7 pages).*
Machine translation of JP-2623385-B2 (1997, 4 pages).*
Aug. 25, 2021 International Preliminary Report on Patentability issued in International Application No. PCT/JP2020/004191.
Apr. 21, 2020 International Search Report issued in International Patent Application No. PCT/JP2020/004191.
Aug. 2, 2023 Search Report issued in Taiwanese Patent Application No. 109105413.
Nov. 2, 2022 Extended European Search Report Issued in European Patent Application No. 20766349.3.
Sep. 22, 2022 Search Report Issued in Chinese Patent Application No. 202080017922.7.

* cited by examiner

NON-CURABLE THERMAL-CONDUCTIVE SILICONE COMPOSITION

TECHNICAL FIELD

The present invention relates to a non-curable thermal-conductive silicone composition.

BACKGROUND ART

It is widely known that electronic parts such as LSIs and IC chips generate heat in use, thereby lowering the performances thereof. As means for solving this problem, various heat dissipating techniques have been used. Typical heat dissipating techniques include a technique involving disposing a cooling member near a heat-generating part and bringing them into close contact to efficiently remove and dissipate heat from the cooling member.

In this event, if there is a space between the heat-generating member and the cooling member, thermal conduction is lowered because of the presence of air, which is poor in heat conductivity, so that the temperature of the heat-generating member cannot be reduced sufficiently. To prevent the presence of such air and enhance heat conductivity, heat-dissipating materials having good heat conductivity and followability to the surface of the member have been conventionally used, such as heat-dissipating greases and heat-dissipating sheets (Patent Documents 1 to 11).

For example, Patent Document 9 discloses a heat conductive silicone grease composition containing an organopolysiloxane having a particular structure, an alkoxysilane having particular substituents, and a heat conductive filler. It is stated that the composition has favorable thermal conductivity, favorable flowability, and excellent workability. Moreover, Patent Documents 10 and 11 disclose sheets having adhesion property and thermal conductivity, and also disclose thermal conductive compositions in each of which an addition-curable silicone rubber composition is blended with a heat conductive filler and a silicone resin having no aliphatic unsaturated hydrocarbon group. Patent Documents 10 and 11 disclose that heat conductive cured products can be provided which have appropriate adhesion property and favorable thermal conductivity in thin-film form.

As actual measures against heat of semiconductor packages including LSIs, IC chips, etc., heat-dissipating greases thinly compressible and capable of attaining low thermal resistance are suitable from the viewpoint of heat-dissipating performance. Heat-dissipating greases can be roughly classified into two: "curable type" which can be cured after compression to desired thickness; and "non-curable type" which keeps grease state without being cured.

"Curable" heat-dissipating greases cured after compression to desired thicknesses expand and contract but hardly flow out (pump out) in a thermal history in which heat generation and cooling of a heat-generating part repeat. This enables the reliability of semiconductor packages to increase. Contrarily, "curable" heat-dissipating greases have practically adverse features.

For example, many addition-curable heat-dissipating greases have been proposed in the past as thermal countermeasures for semiconductor packages (e.g., Patent Document 12). However, most of these have poor storability at room temperature and essentially require freezing or refrigeration for storage, making the product control difficult in some cases. Moreover, the curing requires heating for a certain period. This makes the process complicated and longer, resulting in lower productivity. Further, from the viewpoint of environmental load attributable to the heating step also, addition-curable heat-dissipating greases are not preferable.

Additionally, condensation curable heat-dissipating grease is also one of "curable type" (e.g., Patent Document 13). Since such condensation curable heat-dissipating greases are thickened and cured by the moisture in air, preventing moisture allows the transportation and storage at room temperature, and relatively facilitates the product control. Condensation curable heat-dissipating greases have such an advantage that the curing reaction can proceed without requiring a heating step if a certain amount of moisture is present. Nevertheless, there are large problems to be solved, such as odor and contamination of electronic parts with low-boiling-point components that are separated during the curing reaction.

Meanwhile, "non-curable" heat-dissipating greases have such features that these are easy to handle, for example, the transportation and storage at room temperature are generally possible. Nevertheless, there is a problem that pumping out mentioned above is likely to occur. As a measure to reduce the pumping out of "non-curable" heat-dissipating greases, it is effective to increase the viscosity of the greases. In exchange, this brings about a problem of lowered coating workability.

As described above, it is preferable to use "curable" heat-dissipating greases so as to enhance the reliability of semiconductor packages. However, from the viewpoints of imposing environmental load, and requiring strict temperature control and complicated curing process, it is hard to say that "curable" heat-dissipating greases are preferable.

Meanwhile, "non-curable" heat-dissipating greases are easy to handle and cause less environmental load, but pumping out is likely to happen. To guarantee the reliability of semiconductor packages, the viscosity needs to be increased, but consequently this causes a problem that the coating workability is sacrificed.

CITATION LIST

Patent Literature

Patent Document 1: JP 2938428 B
Patent Document 2: JP 2938429 B
Patent Document 3: JP 3580366 B
Patent Document 4: JP 3952184 B
Patent Document 5: JP 4572243 B
Patent Document 6: JP 4656340 B
Patent Document 7: JP 4913874 B
Patent Document 8: JP 4917380 B
Patent Document 9: JP 4933094 B
Patent Document 10: JP 2008-260798 A
Patent Document 11: JP 2009-209165 A
Patent Document 12: JP 2014-080546 A
Patent Document 13: JP 5365572 B

SUMMARY OF INVENTION

Technical Problem

The present invention has been made in view of the above-described circumstances. An object of the present invention is to provide a thermal-conductive silicone composition which is a "non-curable" heat-dissipating grease containing a large amount of heat conductive filler, but which has excellent coating workability and also favorable pumping-out resistance as a result of keeping appropriate viscosity.

Solution to Problem

To achieve the object, the present invention provides a non-curable thermal-conductive silicone composition comprising essential components of:

(A) an organopolysiloxane having a kinematic viscosity at 25° C. of 1,000,000 mm²/s or more and contained in an amount of 5 to 20 mass % relative to a sum of the component (A) and a component (B);

(B) a hydrolysable organopolysiloxane compound shown by the following general formula (1) and contained in an amount of 80 to 95 mass % relative to the sum of the component (A) and the component (B),

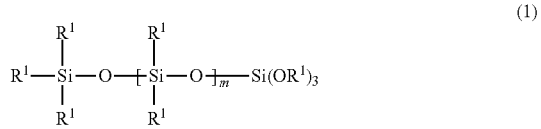

wherein $R^1$'s each represent a monovalent hydrocarbon group having 1 to 10 carbon atoms optionally having a substituent and are identical to or different from one another, and "m" represents an integer of 5 to 100; and (C) at least one heat conductive filler selected from the group consisting of metals, metal oxides, metal hydroxides, metal nitrides, metal carbides, and carbon allotropes, wherein the component (C) is contained in an amount of 10 to 95 mass % relative to a total amount of the composition, wherein a mixture of the component (A) and the component (B) has a molecular weight distribution Mw/Mn of 10 or more.

Although the inventive non-curable thermal-conductive silicone composition is a "non-curable" heat-dissipating grease containing a large amount of the heat conductive filler, the viscosity is kept appropriately, so that the inventive non-curable thermal-conductive silicone composition can have both of excellent coating workability and excellent pumping-out resistance.

In this case, the organopolysiloxane of the component (A) preferably has a kinematic viscosity at 25° C. of 10,000,000 mm²/s or more.

Such a non-curable thermal-conductive silicone composition expands and contracts but hardly causes pumping out in a thermal history in which heat generation and cooling repeat.

Moreover, in the present invention, "m" in the general formula (1) of the hydrolysable organopolysiloxane compound is preferably in a range from 10 to 60.

Such a non-curable thermal-conductive silicone composition can have both of more excellent coating workability and more excellent pumping-out resistance.

Further, in the present invention, the heat conductive filler preferably has a heat conductivity of 10 W/m·K or more.

Such a non-curable thermal-conductive silicone composition surely has excellent thermal conductivity.

Advantageous Effects of Invention

As described above, the inventive thermal-conductive silicone composition is a "non-curable" heat-dissipating grease containing a large amount of heat conductive filler but maintains appropriate viscosity, so that both excellent coating workability and excellent pumping-out resistance are achieved. In other words, the present invention makes it possible to provide a thermal-conductive silicone composition adaptable to increases in heat generation, size, and structural complexity of recent semiconductor devices.

DESCRIPTION OF EMBODIMENTS

As noted above, there have been demands for the development of a thermal conductive silicone composition which is a "non-curable" heat-dissipating grease containing a large amount of heat conductive filler, but which has excellent coating workability and also favorable pumping-out resistance by maintaining suitable viscosity.

The present inventors have earnestly studied to achieve the above object and consequently found that a thermal conductive silicone composition having excellent coating workability and also favorable pumping-out resistance is obtained from a "non-curable" heat-dissipating grease, which contains a large amount of heat conductive filler but appropriately keeps viscosity, by: blending an organopolysiloxane having a kinematic viscosity in a particular range with a hydrolysable organosilane compound; controlling the molecular weight distribution of a mixture of these; and blending a thermal conductivity filler thereto. This finding has led to the completion of the present invention.

Specifically, the present invention is a non-curable thermal-conductive silicone composition comprising essential components of:

(A) an organopolysiloxane having a kinematic viscosity at 25° C. of 1,000,000 mm²/s or more and contained in an amount of 5 to 20 mass % relative to a sum of the component (A) and a component (B);

(B) a hydrolysable organopolysiloxane compound shown by the following general formula (1) and contained in an amount of 80 to 95 mass % relative to the sum of the component (A) and the component (B),

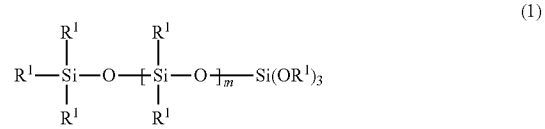

wherein $R^1$'s each represent a monovalent hydrocarbon group having 1 to 10 carbon atoms optionally having a substituent and are identical to or different from one another, and "m" represents an integer of 5 to 100; and (C) at least one heat conductive filler selected from the group consisting of metals, metal oxides, metal hydroxides, metal nitrides, metal carbides, and carbon allotropes, wherein the component (c) is contained in an amount of 10 to 95 mass % relative to a total amount of the composition, wherein a mixture of the component (A) and the component (B) has a molecular weight distribution Mw/Mn of 10 or more.

Hereinafter, the present invention will be described in detail, but the present invention is not limited thereto.

[Non-Curable Thermal-Conductive Silicone Composition]

The present invention relates to a non-curable thermal-conductive silicone composition which has a viscosity kept appropriately even with a large amount of heat conductive filler, and which has favorable reliability.

The inventive non-curable thermal-conductive silicone composition contains (A) an organopolysiloxane with a kinematic viscosity of 1,000,000 mm²/s or more at 25° C., (B) a hydrolysable organopolysiloxane compound, and (C) a heat conductive filler, as essential components. A mixture of the components (A) and (B) has a molecular weight distribution Mw/Mn of 10 or more.

Hereinbelow, the aforementioned components (A) to (C) as the essential components and other optional components will be described in detail. Note that, hereinafter, "non-curable thermal-conductive silicone composition" is also simply referred to as "thermal-conductive silicone composition".

(A) Component

The component (A) is an organopolysiloxane having a kinematic viscosity at 25° C. of 1,000,000 mm²/s or more. The chemical structure is not particularly limited. Examples thereof include unreactive organopolysiloxanes, such as methylpolysiloxane; organopolysiloxanes having two or more aliphatic unsaturated hydrocarbon groups per molecule; organohydrogenpolysiloxanes having two or more hydrogen atoms bonded to silicon atoms per molecule; hydrolysable organopolysiloxanes having two or more hydrolysable groups per molecule; etc. One kind of these may be used alone, or two or more kinds thereof may be used in mixture.

The molecular structure is not particularly limited, and examples thereof include linear structure, branched structure, linear structure having partially branched or cyclic structure, etc. Particularly preferable is a linear structure in which the main chain is composed of diorganosiloxane repeating units and both terminals of the molecular chain are blocked with triorganosiloxy groups. Organopolysiloxane having the linear structure may have a partially branched or cyclic structure.

The kinematic viscosity of the component (A) at 25° C. is 1,000,000 mm²/s or more, preferably 10,000,000 mm²/s or more, further preferably 15,000,000 mm²/s or more. If the kinematic viscosity is less than 1,000,000 mm²/s, pumping out may occur due to expansion and contraction according to a thermal history in which heat generation and cooling of a heat-generating part repeat. Additionally, the component (A) may have a kinematic viscosity at 25° C. of no more than 100,000,000 mm²/s.

The component (A) is blended in an amount of 5 to 20 mass %, preferably 10 to 15 mass %, relative to a sum amount of the components (A) and (B). If the blend amount is less than 5 mass % or more than 20 mass %, excellent coating workability and pumping-out resistance cannot be achieved simultaneously; in addition, it becomes difficult to make the thermal-conductive silicone composition have a viscosity in an appropriate range.

Since it is difficult to directly measure the kinematic viscosity $\eta_A$ (25° C.) of the component (A) in the present invention, the kinematic viscosity $\eta_A$ of the component (A) is determined according to the following.

[1] A toluene solution with the component (A) at 1.0 g/100 mL is prepared to determine the specific viscosity $\eta sp$ (25° C.) according to the following formula. Here, $\eta$ represents the viscosity of the toluene solution, and $\eta 0$ represents the viscosity of toluene. Note that $\eta$ and $\eta 0$ are values measured at 25° C. with an Ubbelohde-type Ostwald viscometer.

$\eta sp = (\eta/\eta 0) - 1$

[2] $\eta sp$ is inserted into the following formula (Huggins formula) to determine the intrinsic viscosity $[\eta]$. Here, K' represents Huggins constant.

$\eta sp = [\eta] + K'[\eta]^2$

[3] $[\eta]$ is inserted into the following formula (A. Kolorlov expression) to determine the molecular weight M.

$[\eta] = 2.15 \times 10^{-4} M^{0.65}$

[4] M is inserted into the following formula (A. J. Barry formula) to determine the kinematic viscosity $\eta_A$ of the component (A).

$\log \eta_A = 1.00 + 0.0123 M^{0.5}$ (B) Component

The component (B) is a hydrolysable organopolysiloxane compound shown by the following general formula (1). The hydrolysable organopolysiloxane compound as the component (B) is used to treat the surface of the heat conductive filler, and serves to assist high filling performance of the filler.

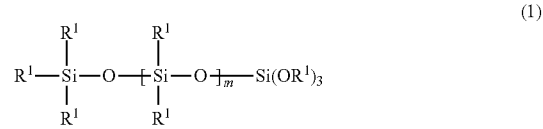

(1)

In the formula, R¹'s each represent a monovalent hydrocarbon group having 1 to 10 carbon atoms optionally having a substituent, and are identical to or different from one another. "m" represents an integer of 5 to 100.

In the formula (1), R¹ is a monovalent hydrocarbon group having 1 to 10 carbon atoms optionally having a substituent. Preferable examples thereof include monovalent saturated aliphatic hydrocarbon groups optionally having a substituent; monovalent unsaturated aliphatic hydrocarbon groups optionally having a substituent; and monovalent aromatic hydrocarbon groups (including aromatic hetero rings) optionally having a substituent. More preferably, R¹ is a monovalent saturated aliphatic hydrocarbon group which may have a substituent; or a monovalent aromatic hydrocarbon group which may have a substituent. Particularly preferably, R¹ is a monovalent saturated aliphatic hydrocarbon group which may have a substituent.

The monovalent saturated aliphatic hydrocarbon groups optionally having a substituent have 1 to 10 carbon atoms, preferably 1 to 8 carbon atoms, further preferably 1 to 6 carbon atoms. Specific examples thereof include linear alkyl groups, such as a methyl group, ethyl group, propyl group, butyl group, pentyl group, hexyl group, heptyl group, and octyl group; branched alkyl groups, such as an isopropyl group, isobutyl group, tert-butyl group, isopentyl group, and neopentyl group; cycloalkyl groups, such as a cyclopentyl group, cyclohexyl group, and cycloheptyl group; halogen-substituted alkyl groups, such as a chloromethyl group, 3-chloropropyl group, 3,3,3-trifluoropropyl group, and bromopropyl group; etc.

The monovalent unsaturated aliphatic hydrocarbon groups optionally having a substituent have 2 to 10 carbon atoms, preferably 2 to 8 carbon atoms, further preferably 2 to 6 carbon atoms. Specific examples thereof include alkenyl groups, such as an ethenyl group, 1-methylethenyl group, and 2-propenyl group; alkynyl groups, such as an ethynyl group and 2-propynyl group; etc.

The monovalent aromatic hydrocarbon groups optionally having a substituent have 6 to 10 carbon atoms, preferably 6 to 8 carbon atoms, further preferably 6 carbon atoms. Specific examples thereof include aryl groups, such as a phenyl group and tolyl group; aralkyl groups, such as a benzyl group and 2-phenylethyl group; halogen-substituted aryl groups, such as an α,α,α-trifluorotolyl group and chlorobenzyl group; etc.

Among these, $R^1$ is preferably a methyl group, an ethyl group, a 3,3,3-trifluoropropyl group, or a phenyl group, further preferably a methyl group, an ethyl group, or a phenyl group, particularly preferably a methyl group.

"m" is an integer of 5 to 100, preferably an integer of 5 to 80, further preferably an integer of 10 to 60. If the value of "m" is smaller than 5, oil bleeding from the silicone composition may become prominent, and the pumping-out resistance may lower. Meanwhile, if the value of "m" is larger than 100, the wettability to the filler becomes insufficient, so that the viscosity of the composition is increased, and the coating workability may degrade.

The component (B) is blended in an amount of 80 to 95 mass %, preferably 85 to 90 mass %, relative to the sum amount of the components (A) and (B). If the blend amount is less than 80 mass % or more than 95 mass %, excellent coating workability and pumping-out resistance cannot be achieved simultaneously; in addition, it becomes difficult to make the thermal-conductive silicone composition have a viscosity in an appropriate range.

Moreover, in the present invention, the mixture of the components (A) and (B) has a molecular weight distribution Mw/Mn of 10 or more, preferably 13 or more, more preferably 15 or more. If the molecular weight distribution Mw/Mn is less than 10, the thermal-conductive silicone composition thereby has a higher viscosity, and the coating workability may lower; moreover, flowing-out is likely to occur according to thermal history in which heat generation and cooling of a heat-generating part repeat, so that the pumping-out resistance may degrade. The mixture of the components (A) and (B) of the present invention can be made to have a molecular weight distribution Mw/Mn of 10 or more by blending an appropriate amount of the organopolysiloxane having a kinematic viscosity at 25° C. of 1,000,000 mm$^2$/s or more as described in the section of (A) Component. Meanwhile, the upper limit of the Mw/Mn is not particularly limited, and can be 20 or less. Note that, in the present invention, the molecular weight distribution is measured by gel permeation chromatography (GPC) using toluene as a solvent.

(C) Component

The component (C) is at least one heat conductive filler selected from the group consisting of metals, metal oxides, metal hydroxides, metal nitrides, metal carbides, and carbon allotropes. Examples thereof include aluminum, silver, copper, metallic silicon, alumina, zinc oxide, magnesium oxide, aluminum oxide, silicon dioxide, cerium oxide, iron oxide, aluminum hydroxide, cerium hydroxide, aluminum nitride, boron nitride, silicon carbide, diamond, graphite, carbon nanotube, graphene, etc. One of these can be used alone, or two or more thereof can be used in appropriate combination. For example, when two heat conductive fillers are used in combination, filling performance can be enhanced by combining heat conductive fillers having different particle sizes, such as large particle constituents and small particle constituents.

In this case, the large particle constituents have an average particle size in a range from preferably 0.1 to 100 μm, more preferably 5 to 50 μm, particularly preferably 10 to 45 μm. When the average particle size is 0.1 μm or more, there is no fear that the resulting composition has excessively high viscosity or poor extensibility. When the average particle size is 100 μm or less, there is no fear that the resulting composition is not uniform.

Moreover, the small particle constituents have an average particle size in a range from preferably 0.01 μm or more and less than 10 μm, more preferably 0.1 to 4 μm. When the average particle size is 0.01 μm or more, there is no fear that the resulting composition has excessively high viscosity or poor extensibility. When the average particle size is 10 μm or less, there is no fear that the resulting composition is not uniform.

The ratio of the large particle constituents and the small particle constituents is not particularly limited, but is preferably in a range from 9:1 to 1:9 (mass ratio). Additionally, the shape of the large particle constituents and the small particle constituents is not particularly limited, and may be spherical, irregular, or needle-shaped, for example.

Note that the average particle size can be determined, for example, as an average value (or median diameter) based on volume in particle size distribution measurement by a laser beam diffraction method.

The component (C) is blended in an amount of 10 to 95 mass %, preferably 20 to 90 mass %, more preferably 30 to 88 mass %, possibly 50 to 85 mass %, relative to a total amount of the composition. If the blend amount is more than 95 mass %, the composition has poor extensibility. If the blend amount is less than 10 mass %, the thermal conductivity becomes poor.

Further, the component (C) (heat conductive filler) has a heat conductivity of preferably 10 W/m·K or more, more preferably 20 W/m·K or more. The component (C) having a heat conductivity of 10 W/m·K or more makes the composition excellent in thermal conductivity.

Other Components

The inventive thermal-conductive silicone composition may contain a conventionally-known antioxidant, as necessary, such as 2,6-di-tert-butyl-4-methylphenol, to prevent deterioration of the composition. Further, a dye, a pigment, a flame retardant, a precipitation-inhibitor, a thixotropy-enhancer, or other additives can be blended as necessary.

Process for Producing Thermal-Conductive Silicone Composition

A method for producing the thermal-conductive silicone composition according to the present invention will be described. The inventive silicone-composition production method is not particularly limited. An example thereof include a method in which the components (A) to (C) are mixed together using, for example, a mixer, such as Trimix, Twinmix or Planetary Mixer (all registered trademarks for mixers manufactured by Inoue Manufacturing Co., Ltd.), Ultramixer (a registered trademark for a mixer manufactured by Mizuho Industrial Co., Ltd.), and a Hivis Disper Mix (a registered trademark for a mixer manufactured by PRIMIX Corporation).

Moreover, the inventive thermal-conductive silicone composition may be mixed while being heated. The heating conditions are not particularly limited. The temperature is normally 25 to 220° C., preferably 40 to 200° C., particularly preferably 50 to 200° C. The time is normally 3 minutes to 24 hours, preferably 5 minutes to 12 hours, particularly preferably 10 minutes to 6 hours. Additionally, deaeration may be performed during the heating.

The inventive thermal-conductive silicone composition has an absolute viscosity of preferably 100 to 1,000 Pa·s, more preferably 150 to 800 Pa·s, further preferably 200 to 600 Pa·s, when measured at 25° C. With the absolute viscosity of 100 Pa·s or more, the heat conductive filler does not precipitate over time during the storage, for example, so that the workability is improved; moreover, the pumping-out resistance is also improved. Meanwhile, with the absolute viscosity of 1,000 Pa·s or less, there is no fear that the coating workability is degraded.

Additionally, the inventive thermal-conductive silicone composition may have a heat conductivity of normally 0.5 to 10 W/m·K.

Note that, in the present invention, the absolute viscosity of the thermal-conductive silicone composition is a value measured at 25° C. with a rotational viscometer, and the heat conductivity is a value measure by hot disc method.

EXAMPLE

Hereinafter, the present invention will be described in more details by showing Examples and Comparative Examples, but the present invention is not limited to the following Examples. Note that the value of the kinematic viscosity of each component (A) was determined according to the above-described, and the values of the other components were measured at 25° C. with an Ubbelohde-type Ostwald viscometer.

[Production of Thermal-Conductive Silicone Compositions]

First, the following components were prepared to produce the inventive thermal-conductive silicone compositions.

Component (A)
 A-1: a dimethylpolysiloxane having a kinematic viscosity at 25° C. of 15,000,000 mm²/s in which both terminals were blocked with trimethylsilyl groups
 A-2: a dimethylpolysiloxane having a kinematic viscosity at 25° C. of 1,500,000 mm²/s in which both terminals were blocked with trimethylsilyl groups
 A-3 (for comparison): a dimethylpolysiloxane having a kinematic viscosity at 25° C. of 100,000 mm²/s in which both terminals were blocked with trimethylsilyl groups
 A-4 (for comparison): a dimethylpolysiloxane having a kinematic viscosity at 25° C. of 30,000 mm²/s in which both terminals were blocked with trimethylsilyl groups
 A-5 (for comparison): a dimethylpolysiloxane having a kinematic viscosity at 25° C. of 10,000 mm²/s in which both terminals were blocked with trimethylsilyl groups
 A-6 (for comparison): a dimethylpolysiloxane having a kinematic viscosity at 25° C. of 5,000 mm²/s in which both terminals were blocked with trimethylsilyl groups Component (B)
 B-1: a dimethylpolysiloxane shown by the following formula (2) and having one terminal blocked with a trimethoxysilyl group

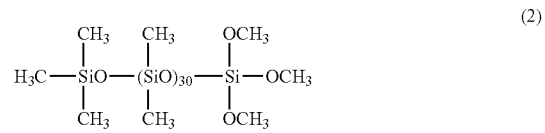

Component (C)
 C-1: an aluminum nitride powder having an average particle size of 1.0 μm (heat conductivity: 180 W/m·K)
 C-2: a zinc oxide powder having an average particle size of 0.5 μm (heat conductivity: 25 W/m·K)
 C-3: an aluminum oxide powder having an average particle size of 10 μm (heat conductivity: 20 W/m·K)

Examples 1 to 7, Comparative Examples 1 to 6
Production of Thermal-Conductive Silicone Compositions The components (A) to (C) were blended according to the formulations shown in Tables 1 to 2 below by the following method to produce silicone compositions.

The components (A), (B), and (C) were introduced into 5-litter Planetary Mixer (manufactured by Inoue Manufacturing Co., Ltd.), and mixed under reduced pressure at 170° C. for 1 hour to produce silicone compositions.

Each of the silicone compositions obtained by this method was measured for viscosity and heat conductivity, and the pumping-out resistance was evaluated according to the following methods. Further, the molecular weight distribution Mw/Mn of each mixture of the components (A) and (B) was determined by GPC analysis using toluene as a solvent. Tables 1 and 2 show the results.

[Viscosity]

The absolute viscosity of each silicone composition was measured using a Malcolm viscometer (type: PC-1T) at 25° C. (at 10 rpm with Rotor-A, and at a shear rate of 6 [1/s]).

[Heat Conductivity]

Each silicone composition was wrapped with kitchen wrap, and the heat conductivity was measured with TPS-2500S manufactured by Kyoto electronics manufacturing Co., Ltd.

[Pumping-Out Resistance]

Each composition in an amount of 0.1 ml was sandwiched between glass plates, and compressed for 15 minutes using two clips with 1.8 kgf (17.65 N). The area of the composition at this point is designated as α. The resultant was vertically placed in a thermal shock test chamber where −65° C./30 minutes and 150° C./30 minutes were repeated, and taken out after 500 cycles. The area at this point is designated as β, and a formula β/α was calculated. Moreover, an area (=γ) of a region with no composition within the area β was quantified by image processing, and a formula γ/β was calculated. Thus, evaluation was made such that the smaller the values of β/α and γ/β, the more excellent the pumping-out resistance.

TABLE 1

|  |  | Example | | | | | | |
|---|---|---|---|---|---|---|---|---|
|  |  | 1 | 2 | 3 | 4 | 5 | 6 | 7 |
| Composition | A-1 | 20 |  | 13 | 23 | 20 | 20 | 20 |
|  | (parts by mass) |  |  |  |  |  |  |  |
|  | A-2 |  | 35 |  |  |  |  |  |
|  | (parts by mass) |  |  |  |  |  |  |  |
|  | A-3 |  |  |  |  |  |  |  |
|  | (parts by mass) |  |  |  |  |  |  |  |
|  | A-4 |  |  |  |  |  |  |  |
|  | (parts by mass) |  |  |  |  |  |  |  |
|  | A-5 |  |  |  |  |  |  |  |
|  | (parts by mass) |  |  |  |  |  |  |  |

TABLE 1-continued

|  |  | Example | | | | | | |
|---|---|---|---|---|---|---|---|---|
|  |  | 1 | 2 | 3 | 4 | 5 | 6 | 7 |
|  | A-6 (parts by mass) |  |  |  |  |  |  |  |
|  | B-1 (parts by mass) | 180 | 165 | 187 | 177 | 180 | 180 | 180 |
|  | C-1 (parts by mass) | 1000 | 1000 | 1000 | 1000 |  |  |  |
|  | C-2 (parts by mass) |  |  |  |  | 1000 | 600 | 1000 |
|  | C-3 (parts by mass) |  |  |  |  |  | 1400 | 1400 |
|  | Molecular weight distribution Mw/Mn of mixture of components (A) and (B) | 15.9 | 10.8 | 14.1 | 17.6 | 15.9 | 15.9 | 15.9 |
| Evaluation Results | Absolute viscosity (Pa·s) | 290 | 320 | 140 | 350 | 190 | 250 | 200 |
|  | Heat conductivity (W/m·K) | 2.0 | 1.9 | 1.9 | 2.0 | 1.3 | 3.1 | 3.3 |
|  | Pumping-out resistance (β/α) | 1.7 | 2.0 | 2.2 | 1.3 | 1.8 | 1.5 | 1.4 |
|  | Pumping-out resistance (γ/β) | 0.06 | 0.07 | 0.18 | 0.05 | 0.10 | 0.09 | 0.11 |

TABLE 2

|  |  | Comparative Example | | | | | |
|---|---|---|---|---|---|---|---|
|  |  | 1 | 2 | 3 | 4 | 5 | 6 |
| Composition | A-1 (parts by mass) |  |  |  |  |  | 45 |
|  | A-2 (parts by mass) |  |  |  |  | 8 |  |
|  | A-3 (parts by mass) | 65 |  |  |  |  |  |
|  | A-4 (parts by mass) |  | 89 |  |  |  |  |
|  | A-5 (parts by mass) |  |  | 121 |  |  |  |
|  | A-6 (parts by mass) |  |  |  | 150 |  |  |
|  | B-1 (parts by mass) | 135 | 111 | 79 | 50 | 192 | 155 |
|  | C-1 (parts by mass) | 1000 | 1000 | 1000 | 1000 | 1000 | 1000 |
|  | C-2 (parts by mass) |  |  |  |  |  |  |
|  | C-3 (parts by mass) |  |  |  |  |  |  |
|  | Molecular weight distribution Mw/Mn of mixture of components (A) and (B) | 9.0 | 7.3 | 6.0 | 3.9 | 3.2 | No Paste |
| Evaluation Results | Absolute viscosity (Pa·s) | 390 | 440 | 490 | 600 | 120 |  |
|  | Heat conductivity (W/m·K) | 1.9 | 1.9 | 1.9 | 1.8 | 1.8 |  |
|  | Pumping-out resistance (β/α) | 2.6 | 2.7 | 3.0 | 3.2 | 2.8 |  |
|  | Pumping-out resistance (γ/β) | 0.43 | 0.55 | 0.62 | 0.75 | 0.31 |  |

From the results in Tables 1 to 2, each of the silicone compositions of Examples 1 to 7 satisfying the requirements of the present invention had appropriate viscosity and also had small values of β/α and γ/β, which are indicators of pumping-out resistance. This clearly indicates that flowing-out (pumping out) of the silicone compositions due to expansion and contraction in the thermal history hardly occurs. In other words, the inventive silicone compositions are capable of achieving both excellent coating workability and excellent pumping-out resistance. In contrast, the silicone compositions of Comparative Examples 1 to 6 did not have appropriate viscosity, and/or had large values of β/α and γ/β, which are indicators of pumping-out resistance. Hence, both of excellent coating workability and excellent pumping-out resistance cannot be achieved simultaneously.

From the foregoing, the inventive thermal-conductive silicone compositions are "non-curable" heat-dissipating greases containing a large amount of heat conductive filler but keep appropriate viscosity, so that both of excellent coating workability and excellent pumping-out resistance are achieved. Thus, the present invention makes it possible to provide thermal-conductive silicone compositions that are adaptable to increases in generated heat, size, and structural complexity of recent semiconductor devices.

It should be noted that the present invention is not limited to the above-described embodiments. The embodiments are just examples, and any examples that substantially have the same feature and demonstrate the same functions and effects as those in the technical concept disclosed in claims of the present invention are included in the technical scope of the present invention.

The invention claimed is:

1. A non-curable thermal-conductive silicone composition comprising essential components of:
   (A) an organopolysiloxane having a kinematic viscosity at 25° C. of 1,000,000 mm²/s or more and contained in an amount of 5 to 20 mass % relative to a sum of the component (A) and a component (B);
   (B) a hydrolysable organopolysiloxane compound shown by the following general formula (1) and contained in an amount of 80 to 95 mass % relative to the sum of the component (A) and the component (B),

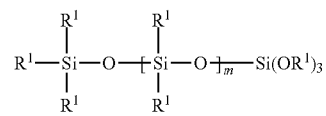

(1)

wherein $R^1$'s each represent a monovalent hydrocarbon group having 1 to 10 carbon atoms optionally having a substituent and are identical to or different from one another, and "m" represents an integer of 5 to 100; and
   (C) at least one heat conductive filler selected from the group consisting of metals, metal oxides, metal hydroxides, metal nitrides, metal carbides, and carbon allotropes, wherein the component (C) is contained in an amount of 10 to 95 mass % relative to a total amount of the composition,
   wherein a mixture of the component (A) and the component (B) has a molecular weight distribution Mw/Mn of 10 or more.

2. The non-curable thermal-conductive silicone composition according to claim 1, wherein the organopolysiloxane of the component (A) has a kinematic viscosity at 25° C. of 10,000,000 mm²/s or more.

3. The non-curable thermal-conductive silicone composition according to claim 1, wherein "m" in the general formula (1) of the hydrolysable organopolysiloxane compound is in a range from 10 to 60.

4. The non-curable thermal-conductive silicone composition according to claim 2, wherein "m" in the general formula (1) of the hydrolysable organopolysiloxane compound is in a range from 10 to 60.

5. The non-curable thermal-conductive silicone composition according to claim 1, wherein the heat conductive filler has a heat conductivity of 10 W/m·K or more.

6. The non-curable thermal-conductive silicone composition according to claim 2, wherein the heat conductive filler has a heat conductivity of 10 W/m·K or more.

7. The non-curable thermal-conductive silicone composition according to claim 3, wherein the heat conductive filler has a heat conductivity of 10 W/m·K or more.

8. The non-curable thermal-conductive silicone composition according to claim 4, wherein the heat conductive filler has a heat conductivity of 10 W/m·K or more.

* * * * *